United States Patent [19]

Caesar

[11] 4,164,398

[45] Aug. 14, 1979

[54] ENTRAINMENT SEPARATOR

[75] Inventor: Michael B. Caesar, Lake City, Fla.

[73] Assignee: Occidental Research Corporation, Irvine, Calif.

[21] Appl. No.: 909,898

[22] Filed: May 26, 1978

[51] Int. Cl.[2] .......... B01D 45/08

[52] U.S. Cl. .......... 55/186; 55/226; 55/422; 55/465

[58] Field of Search .......... 55/52, 185, 186, 226, 55/328, 422, 465

[56] References Cited

U.S. PATENT DOCUMENTS

| | | | |
|---|---|---|---|
| 2,742,976 | 4/1956 | Toth et al. | 55/465 X |
| 3,530,649 | 9/1970 | Porsch et al. | 55/465 X |
| 4,002,432 | 1/1977 | Brice et al. | 55/185 X |

FOREIGN PATENT DOCUMENTS

| | | | |
|---|---|---|---|
| 1571784 | 5/1966 | Fed. Rep. of Germany | 55/52 |

*Primary Examiner*—Charles N. Hart
*Assistant Examiner*—Richard W. Burks
*Attorney, Agent, or Firm*—Barry A. Bisson

[57] ABSTRACT

An entrainment separator for separating liquids from gases and solids from gases, including a housing providing an inlet at one end and an outlet at the opposed end, an adjustable planar surface providing a face facing the inlet and an opposed face, an annular deflector beneath the planar surface attached to the housing and extending inward of the housing and positioned relative to the planar surface to provide an opening between the planar surface and annular deflector, means to adjust the position of the planar surface relative to the annular deflector, a tube attached to the opposed face of the planar surface and extending downward of the inlet, a funnel providing a downward extending spout positioned below the tube, means providing flow of liquid in the funnel past the tube and to the spout, and a gas outlet extending through the side of the housing.

21 Claims, 1 Drawing Figure

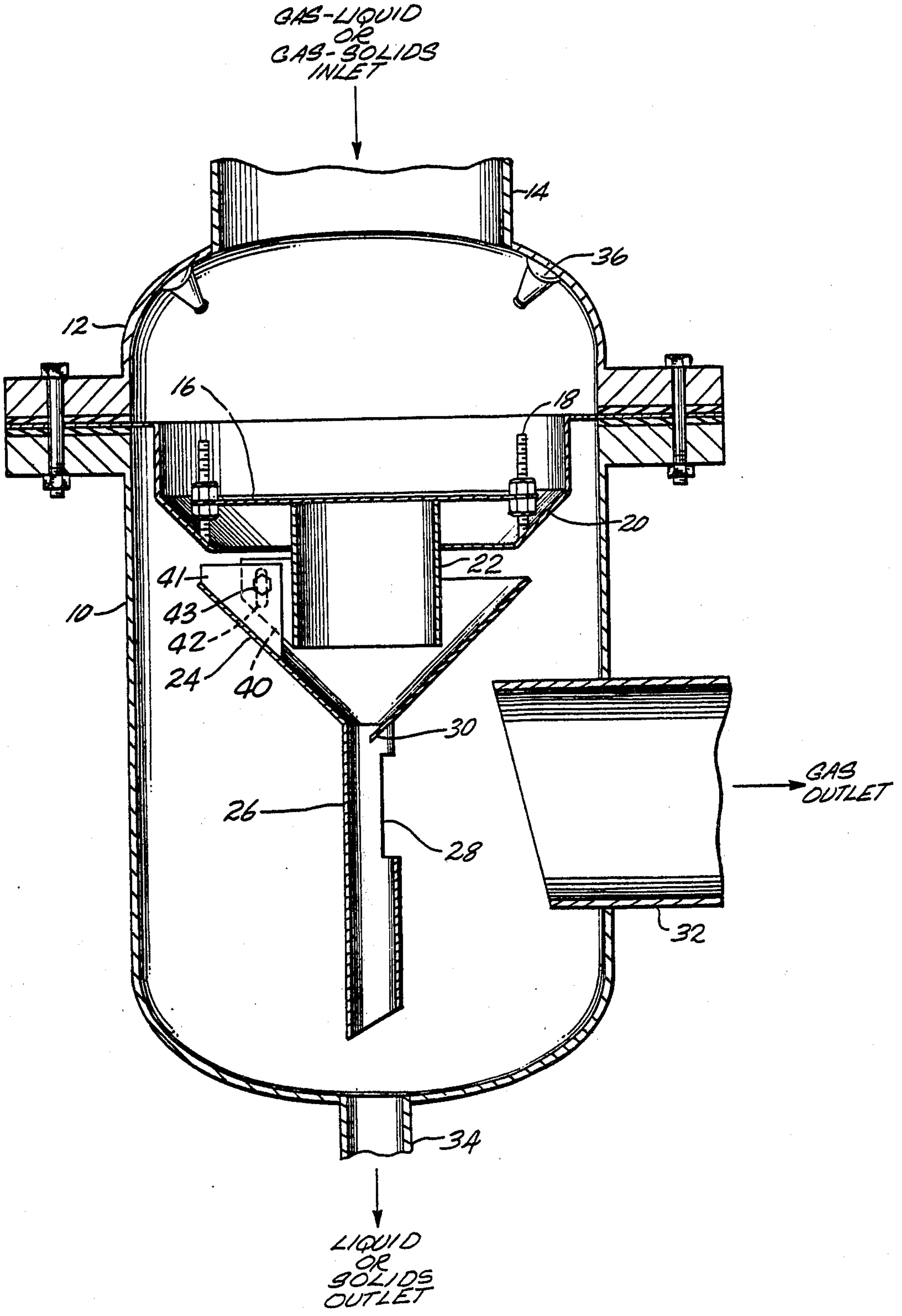
GAS-LIQUID OR GAS-SOLIDS INLET
14
36
12
16
18
20
22
41
43
42
24
40
10
30
26
28
GAS OUTLET
32
34
LIQUID OR SOLIDS OUTLET

ENTRAINMENT SEPARATOR

BACKGROUND OF THE INVENTION

The present invention relates to an entrainment separator. More particularly, it relates to an entrainment separator for the separation of entrained solids or liquids from gases, preferably entrained liquids.

It has been well known that dispersions of liquids in gases and gases in liquids are always fundamentally unstable mixtures. Left to themselves, they will generally separate into massive collections of the component phases. In many instances, however, such natural separation occurs over a long period of time. For industrial uses and independent of origin of the dispersion, whether intentional or inadvertent, the gas-liquid dispersions generally are always ultimately separated. The separation may consist merely of removal of the aggregated and collected phases, or it may involve aggregation and collection as well as removal. Often the rate at which the process of separation would occur naturally is slow and uneconomical. In such cases the separation operation may be enhanced by the artificial acceleration of the natural process.

There are many reasons why gas-liquid dispersions should be separated. The quality of a process stream or of a product can suffer unless adulterating material in the form of another dispersed phase is removed. The efficiency of staged mass transfer operations can be reduced if there is mechanical carry-over of a dispersed phase with the continuous stream from one stage to the next. Valuable material can be lost from a system because of incomplete separation of dispersed material. With improper separation of the gas-liquid dispersion, there can be intrusion of an unwanted phase into equipment along the line of processing which may result in poor performance or damage to the equipment. A discharge of a gas-liquid dispersion from a stack can result in atmospheric pollution and possible destruction of property.

Many methods are employed to separate gas-liquid dispersion systems. Such methods include: gravitational, inertial, absorption, dilution, physicochemical, electrical, and thermal. Often more than one method is effective and the methods may be combined for synergistic effect. Many separators employing the above systems and procedures are the product of invention or accumulated experience and have never been completely described scientifically. Many such methods and apparatus for separating entrained liquids from gases are designed specifically for the conditions peculiar to a given gas-liquid dispersion system and the mechanical apparatus also peculiar to that system.

SUMMARY OF THE INVENTION

In accordance with this invention, there is disclosed an entrainment separator for separating liquids from gases and solids from gases comprising:

a. a housing providing an inlet at one end, an outlet at the opposed end and an outlet disposed along the side;

b. an adjustable planar surface providing a face facing the inlet and an opposed face;

c. an annular deflector beneath the planar surface, attached to the housing and extending inward of the housing and positioned relative to the planar surface to provide an opening between the planar surface and annular deflector;

d. means to adjust the position of the planar surface relative to the annular deflector;

e. a tube attached to the opposed face of the planar surface and extending downward of the inlet;

f. a funnel providing a downward extending spout positioned below the tube; and g. means providing flow of liquid in the funnel past the tube and to the spout.

DRAWINGS

These and other features and advantages of the present invention will be appreciated as the same becomes better understood by reference to the following detailed description and accompanying drawing, which is a longitudinal cross-sectional view through the entrainment separator.

DETAILED DESCRIPTION

With reference to the drawing, the entrainment separator comprises a housing 10. Positioned on housing 10 is removable cover 12 having an inlet 14. Positioned directly below and in line with inlet 14 is planar surface 16 which forms a plane perpendicular to the plane defined by the sides of inlet 14. Planar surface 16 has a face directed toward inlet 14 and an opposed face. Planar surface 16 is positioned in proximity to and lying within a concave cavity formed by annular deflector 20 which is attached to housing 10. Annular deflector 20 attached to housing 10 extends, generally, downward and inward of the housing. The slope inward of annular deflector 20 is from about 15° to about 75° from vertical. It is preferred that the annular deflector have an inward slope of from about 30° to about 60°. Planar surface 16 has adjustment means 18 by which the position of the planar surface is adjusted in relation to annular deflector 20. An opening between planar surface 16 and annular deflector 20 is defined by the edge of the planar surface 16 and annular deflector 20. By adjusting the adjustment means 18, the width of the opening is correspondingly adjusted.

Attached to the opposed face of planar surface 16 is tube 22. The sides of tube 22 are perpendicular to the plane of planar surface 16. Tube 22 extends downward from planar surface 16 into the mouth of funnel 24 lying directly below planar surface 16. Funnel 24 has a spout 26 extending downward toward the bottom of housing 10. Lying below spout 26 is a liquid or solids outlet 34. Spout 26 can have a lateral gas exhaust port 28. If spout 26 has a gas port 28, shield 30 is provided and positioned directly above gas port 28 and attached to funnel 24 to prevent liquid or solids from flowing through the opening. A gas outlet 32 is positioned on the side of housing 10, directly facing and in line with gas port 28. The entrainment separator of this invention is designed to separate liquids and solids from the gas in which they are entrained. Although the separator of the invention can be used to separate solid particles from gases, it is particularly suited to separate liquids from gases. It is preferable that the entrainment separator for separating solids from gases have washing means 36 for washing the solids, disengaged from the gas, from the surfaces on which they accumulate. Such washing means include a spray or series of spray nozzles, ring sprayers and the like.

The description of the entrainment separator will be better understood by the following discussion of the flow of gas-liquid dispersion therethrough.

The gas-liquid dispersion to be separated enters in a downward flow into the entrainment separator housing 10 through inlet 14 located on cover 12. Cover 12 can be either fixed or removable. It has been found to be preferred to have the cover removable to facilitate inspection, cleaning, adjustment or repair of the separator.

The downward flowing gas-liquid dispersion strikes planar surface 16 which lies directly in the path of the dispersion flow. The planar surface diverts the flow of gas but the liquid entrained in the dispersion is impinged on the planar surface. The entrained liquid droplets in the dispersion are carried toward the planar surface by their large downward flowing momentum relative to the gas flow and the liquid droplets thereby impinge upon the planar surface. The gas continues to flow around the edges of the planar surface striking annular deflector 20. The annular deflector directs the gas through the opening between the planar surface and the annular deflector. Any liquid which remained in the gas after striking the planar surface is impinged onto the surface of the annular deflector. The gas passing through the opening between the planar surface and annular deflector is directed by the annular deflector into the sides of tube 22. Any liquid which still remains in the gas may also impinge or disengage from the gas by centrifugal force onto the surface of tube 22. The gas flow substantially continues around tube 22 toward gas outlet 32. However, some gas will strike funnel 24. Any liquid remaining in the gas striking the funnel can be impinged on the surface thereof. The flow of substantially liquid-free gas from the funnel and the tube continues due to the gas flow pressure striking the side of the housing whereupon remaining liquid is impinged or disengaged from the gas by centrifugal force and the gas then flows through gas-outlet 32 located on the side of housing 10.

It is preferred that the gas-outlet 32 extend into the housing 10 to prevent re-entrainment of the liquid that collected on the interior wall of the housing as it flows down the wall toward the liquid outlet.

The flow of gas and the velocity thereof can be controlled by the adjustment means 18 located on planar surface 16. As recited above, the adjustment means positions planar surface 16 relative to annular deflector 20 and thereby controls the width of the opening between the planar surface and the annular deflector. The planar surface lies within the concave cavity of the annular deflector. By raising or lowering the planar surface, the opening is correspondingly widened or narrowed. Any convenient adjustment means can be used to adjust the planar surface such as bolt and nut, bolt with threaded aperture in the planar surface, slide fastener, and the like.

The liquid impinged on planar surface 16 collects on the surface until droplets of sufficient size are formed such that they begin to run off the planar surface. The drops of liquid fall off the edge of the planar surface striking annular deflector 20. The liquid flows down the annular deflector. The inner and lower edge of the annular deflector extends inward of housing 10 and over the mouth of funnel 24 lying below. The liquid that has run off the planar surface flows down the annular deflector collecting any liquid impinged thereon and drops into funnel 24. Liquid that is impinged on tube 22 likewise drops into funnel 24. Funnel 24 can be attached to the housing or can be attached to tube 22. Preferably, funnel 24 is attached to the tube or housing in such a manner that it can be readily removed to facilitate cleaning. It is preferred that the funnel be attached to the tube such that a gap of from about $\frac{1}{8}$ to about $\frac{1}{4}$ inches is formed between the funnel and tube. Alternatively, the funnel can be attached to the lower end of the tube with slots provided in the tube to enable liquid to flow from the funnel to the spout. More preferably, the means of attachment of the funnel to the tube are adjustable to vary the gap within the desired range of about $\frac{1}{8}$ to $\frac{1}{4}$ inches. The liquid collected in funnel 24 flows down spout 26 and drops out of the tip of the spout into liquid outlet 34 and out of housing 10 of the separator. Any liquid impinged on the side of the housing or outlet 32 runs off the surface of the outlet, down the side of the housing and out liquid outlet 34.

Generally, the gas will not substantially flow through the funnel because of the constriction between the mouth and spout of the funnel and because the gas is free to flow upward out of the funnel. However, a gas exhaust port 28 can be provided in spout 26 of funnel 24 to allow any gas passing down the spout a passageway out of the funnel. The gas port allows the gas to pass out of the spout rather than pass through the narrow spout at the same time as the liquid. The gas port provides a pathway of least resistance for gas out of the spout. The passage of the liquid down the spout is also enhanced by the availability of gas port 28. From gas port 28, the gas can flow directly to the gas outlet 32. Liquid is prevented from flowing out of the gas port by a shield 30 positioned over the gas port. The shield directs the flow of liquid away from the gas port.

The invention is further illustrated by the following detail of an operative unit. An entrainment separator for separating liquids from gases was constructed having an overall height of 3 feet, 6$\frac{3}{8}$ inches and a diameter of 1 foot, 2 inches. The base portion of the housing for the separator was 2 feet, $\frac{3}{8}$ inches in height. A removable cover 1 foot, 6 inches high fits on top of the base portion of the housing. The removable cover was fitted with means for securely fastening the cover onto the base portion of the housing.

An 8 inch diameter gas-liquid dispersion inlet was provided on top of the removable cover. Below the inlet was a 10 inch in diameter circular planar surface with one side thereof directed toward the inlet. The planar surface was positioned within the concave cavity created by an annular deflector. The annular deflector had an inward slope of 45° and had an opening at the bottom thereof of 9 inches in diameter. The planar surface was fitted with three adjustment means of a bolt and two nuts each, to position the planar surface above the annular deflector. By adjusting the nuts on the bolts, the planar surface could be raised or lowered.

Attached to the bottom side of the planar surface was a 4 inch in diameter tube, approximately 6 inches long. The tube was fastened perpendicular to the planar surface and extended downward therefrom toward a funnel. The funnel was attached to the tube such that a gap of from about $\frac{1}{8}$ to about $\frac{1}{4}$ inches was formed between the tube and funnel. The funnel mouth had a 10 inches in diameter opening and narrowed to an outlet and spout of 1$\frac{1}{2}$ inches in diameter. The tube extended approximately 2$\frac{1}{2}$ inches down into the mouth of the funnel. The funnel had a downward slope of 45°. The spout on the funnel was 9 inches long and the tip of the spout was cut on a 30° bias. The spout was positioned over a 1$\frac{1}{2}$ inch diameter outlet, 4 inches long on the bottom of the separator.

Along the spout of the funnel was a gas port approximately $\frac{1}{8}$ to $\frac{3}{8}$ inches deep and 3 inches down the spout. Positioned over the gas port was a shield approximately 1 inch long and at a downward slope of 45°. Across from the gas port was a gas outlet 6 inches in diameter, and approximately 9 inches long at the top thereof and 7 inches long at the bottom, centered 13 inches up from the bottom of the separator and extending 6 inches from the side of the housing of the separator and extending about 3 inches at the top into the housing.

Tube 22 has a plurality (e.g., 3 or 4) of slotted lug members (one of which 40 is shown in the figure) which correspond with slotted lugs 41 on the cone 24 and permit vertical adjustment of the gap between cylinder 22 and cone 24. The adjustment is made such that the disengaged liquid can flow down cone 24, but not so great as to permit excess flow of air downward. The slots are shown as 42 in the FIGURE. Clamping is achieved by bolt and nut, 43.

By including a means of spraying a mist or drops of liquid into the top section of the separator described herein, the apparatus can also be useful as a liquid-liquid or liquid-gas contactor which is the subject of my application titled "Contactor and Entrainment Separator," filed of even date herewith, the entire disclosure of which is hereby incorporated herein by this reference.

What is claimed is:

1. An entrainment separator for separating liquids from gases and solids from gases comprising:

a. a housing providing an inlet at one end, an outlet at the opposed end and an outlet disposed along the side;

b. an adjustable planar surface providing a face facing the inlet and an opposed face;

c. an annular deflector beneath the planar surface, attached to the housing and extending inward of the housing and positioned relative to the planar surface to provide an opening between the planar surface and annular deflector;

d. means to adjust the position of the planar surface relative to the annular deflector;

e. a tube attached to the opposed face of the planar surface and extending downward of the inlet;

f. a funnel providing a downward extending spout positioned below the tube; and g. means providing flow of liquid in the funnel past the tube and to the spout.

2. The entrainment separator of claim 1 wherein the housing has a removable cover providing the inlet.

3. The entrainment separator of claim 1 wherein the funnel is secured to the tube.

4. The entrainment separator of claim 3 wherein the funnel is secured to said tube by adjustable means whereby the gap between the tube and funnel can be adjusted.

5. The entrainment separator of claim 1 wherein the funnel is secured to the housing.

6. The entrainment separator of claim 1 wherein the spout extending downward from the funnel has a lateral gas port thereon and wherein a shield is attached to the funnel and positioned above and in proximity to the gas port.

7. The entrainment separator of claim 1 wherein the annular deflector has a downward and inward slope of from about 15° to about 75°.

8. The entrainmment separator of claim 1 wherein the annular deflector has a downward and inward slope of from about 30° to about 60°.

9. The entrainment separator of claim 1 wherein the outlet disposed along the side of the housing extends through the side and into the housing.

10. The entrainment separator of claim 1 wherein washing means are provided for washing the collected material from the surfaces on which they collect and out the outlet at the end of the housing.

11. The entrainment separator of claim 10 wherein the washing means is a sprayer or series of sprayer nozzles.

12. An entrainment separator for separating liquids from gases and solids from gases comprising:

a. a housing providing an outwardly extending flange at one end, an outlet at the opposed end and an outlet disposed along the side;

b. a removable cover on the housing supported by the flange providing an inlet;

c. means to secure the cover to the housing;

d. an adjustable planar surface providing a face facing the inlet and an opposed face;

e. an annular deflector beneath the planar surface, adapted to be supported by and secured to the flange, extending inward and downward of the housing and positioned relative to the planar surface and annular deflector;

f. means to adjust the position of the planar surface relative to the annular deflector;

g. a tube attached to the opposed face of the planar surface and extending downward of the inlet;

h. a funnel providing a downward extending spout positioned below the tube; and i. means providing flow of liquid in the funnel past the tube and to the spout.

13. The entrainment separator of claim 12 wherein the funnel is secured to the tube.

14. The entrainment separator of claim 13 wherein the funnel is secured to said tube by adjustable means whereby the gap between the tube and funnel can be adjusted.

15. The entrainment separator of claim 12 wherein the funnel is secured to the housing.

16. The entrainment separator of clam 12 where the spout extending downward from the funnel has a lateral gas port thereon and wherein a shield is attached to the funnel and positioned above and in proximity to the gas port.

17. The entrainment separator of claim 12 wherein the annular deflector has a downward and inward slope of from about 15° to about 75°.

18. The entrainment separator of claim 12 wherein the annular deflector has a downward and inward slope of from about 30° to about 60°.

19. The entrainment separator of claim 12 wherein the outlet disposed along the side of the housing extends through the side and into the housing.

20. The entrainment separator of claim 12 wherein washing means are provided for washing the collected material from the surfaces on which they collect and out the outlet at the end of the housing.

21. The entrainment separator of claim 20 wherein the washing means is a sprayer or series of sprayer nozzles.

* * * * *